United States Patent
Boyd et al.

(10) Patent No.: US 12,252,995 B2
(45) Date of Patent: Mar. 18, 2025

(54) ACOUSTICAL HEALTH MONITORING OF GAS TURBINE ENGINES

(71) Applicant: PRATT & WHITNEY CANADA CORP., Longueuil (CA)

(72) Inventors: Peter Boyd, Mississauga (CA); Andrew Ghattas, La Prairie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 270 days.

(21) Appl. No.: 17/892,777

(22) Filed: Aug. 22, 2022

(65) Prior Publication Data
US 2024/0060428 A1 Feb. 22, 2024

(51) Int. Cl.
*F01D 21/00* (2006.01)
*G01M 15/14* (2006.01)

(52) U.S. Cl.
CPC .......... *F01D 21/003* (2013.01); *G01M 15/14* (2013.01); *F05D 2220/323* (2013.01); *F05D 2260/80* (2013.01); *F05D 2260/83* (2013.01)

(58) Field of Classification Search
USPC .......................................................... 73/579
See application file for complete search history.

(56) References Cited

U.S. PATENT DOCUMENTS

| | | | |
|---|---|---|---|
| 7,971,475 B2* | 7/2011 | Schneider | F02D 41/22 73/114.07 |
| 8,655,571 B2 | 2/2014 | Geib | |
| 8,843,348 B2* | 9/2014 | Pascu | G01M 15/00 702/183 |
| 9,183,519 B2* | 11/2015 | Macchia | G07C 5/0808 |
| 9,784,635 B2* | 10/2017 | Bizub | F02D 41/1497 |
| 10,018,596 B2 | 7/2018 | Tralshawala et al. | |
| 10,495,546 B2* | 12/2019 | Bense | G01N 29/14 |
| 11,085,815 B2 | 8/2021 | Kim | |
| 2007/0056376 A1* | 3/2007 | King | G01H 1/003 73/660 |

(Continued)

FOREIGN PATENT DOCUMENTS

CA 2958896 A1 9/2017

OTHER PUBLICATIONS

European Patent Office, Communication re. extended European search report for European patent application No. 23192032.3, Jan. 8, 2024.

*Primary Examiner* — Clayton E. LaBalle
*Assistant Examiner* — Warren K Fenwick
(74) *Attorney, Agent, or Firm* — Norton Rose Fulbright Canada LLP (57) ABSTRACT

Health monitoring systems and associated methods for gas turbine engines are provided. A health monitoring method includes using a microphone to acquire operation data indicative of acoustic energy generated in a core gas path of the gas turbine engine. The operation data is compared to reference data indicative of an acoustic signature of fluid noise associated with a non-normal condition in the core gas path of the gas turbine engine. Based on the comparing of the operation data to the reference data, the non-normal condition is determined to exist within the core gas path of the gas turbine engine. A signal indicative of the existence of the non-normal condition within the core gas path of the gas turbine engine is output.

17 Claims, 5 Drawing Sheets

(56) References Cited

U.S. PATENT DOCUMENTS

| | | | |
|---|---|---|---|
| 2007/0255563 A1* | 11/2007 | Dooley | F02D 41/22 |
| | | | 704/E15.045 |
| 2017/0260871 A1 | 9/2017 | Schmidt et al. | |
| 2020/0300111 A1* | 9/2020 | Hussain | G01M 15/14 |
| 2020/0408106 A1 | 12/2020 | Karnofski et al. | |

* cited by examiner

FIG-1

| Non-normal Conditions | Acoustic Characteristics |
|---|---|
| Damaged rotor blade | AC1 |
| Fluid leak from conduit | AC2 |
| Liberated fragment | AC3 |
| Aerodynamic instability in compressor | AC4 |

FIG - 4

ACOUSTICAL HEALTH MONITORING OF GAS TURBINE ENGINES

TECHNICAL FIELD

The application relates generally to gas turbine engines and, more particularly, to monitoring gas turbine engines.

BACKGROUND

Gas turbine engines used for aircraft applications may have monitoring equipment for detecting non-normal conditions associated with such gas turbine engines. However, certain non-normal conditions may not be detectable by conventional means, or may be detected only after some escalation of the non-normal conditions has occurred. Improvements in monitoring of gas turbine engines is desirable.

SUMMARY

In one aspect, the disclosure describes a method of operating a gas turbine engine. The method comprises:
  receiving reference data indicative of an acoustic signature of fluid noise associated with a non-normal condition in a core gas path of the gas turbine engine;
  during operation of the gas turbine engine, acquiring operation data indicative of acoustic energy generated in the core gas path of the gas turbine engine;
  comparing, at a controller of the gas turbine engine, the operation data to the reference data;
  determining, based on the comparing of the operation data to the reference data, an existence of the non-normal condition in the core gas path of the gas turbine engine; and
  in response to determining the existence of the non-normal condition, generating, at the controller of the gas turbine engine, a signal indicative of the existence of the non-normal condition in the core gas path of the gas turbine engine.

In another aspect, the disclosure describes a health monitoring system for a gas turbine engine, the monitoring system comprises:
  a microphone operable to acquire operation data indicative of acoustic energy generated in a core gas path of the gas turbine engine during operation of the gas turbine engine;
  one or more data processors operatively coupled to the microphone; and
  non-transitory machine-readable memory storing:
  reference data indicative of an acoustic signature of fluid noise associated with a non-normal condition in the core gas path of the gas turbine engine;
  instructions executable by the one or more data processors and configured to cause the one or more data processors to:
  compare the operation data acquired by the microphone to the reference data;
  determine, based on the comparing of the operation data to the reference data, an existence of the non-normal condition in the core gas path of the gas turbine engine; and
  generate a signal indicative of the existence of the non-normal condition in the core gas path of the gas turbine engine.

In a further aspect, the disclosure describes a health monitoring method for a gas turbine engine. The health monitoring method comprises:
  during operation of the gas turbine engine, using a microphone to acquire operation data indicative of acoustic energy generated in a core gas path of the gas turbine engine;
  using one or more data processors to:
  compare the operation data to reference data indicative of an acoustic signature of fluid noise associated with a non-normal condition in the core gas path of the gas turbine engine;
  determine, based on the comparing of the operation data to the reference data, an existence of the non-normal condition within the core gas path of the gas turbine engine; and
  output a signal indicative of the existence of the non-normal condition within the core gas path of the gas turbine engine.

Further details of these and other aspects of the subject matter of this application will be apparent from the detailed description included below and the drawings.

BRIEF DESCRIPTION OF THE DRAWINGS

Reference is now made to the accompanying figures in which.

DETAILED DESCRIPTION

The present disclosure relates to systems and methods for operating and (e.g., health) monitoring of gas turbine engines. In some embodiments, the systems and methods herein may help assess a condition of a gas turbine engine by acquiring operation data indicative of acoustic energy generated in a core gas path of the gas turbine engine, and comparing the operation data to reference data indicative of an acoustic signature of aerodynamic or other fluid noise associated with a non-normal (e.g., operating) condition in the core gas path of the gas turbine engine. Based on this comparison, it may be determined that one or more non-normal conditions exist within the core gas path. In response to determining the existence of a non-normal condition, a suitable (e.g., alert, remedial) action may be initiated.

In some embodiments, the systems and methods described herein may allow for early detection of some non-normal conditions in the core gas path of the gas turbine engine. Some acoustic signatures generated by fluid(s) in the core gas path during non-normal conditions may be undetectable by traditional health monitoring means and/or by the aircraft crew, and therefore could go undetected until such non-normal conditions has escalated. In some embodiments, acquiring operation data indicative of acoustic energy generated in the core gas path and comparing the operation data to reference data indicative of an acoustic signature of fluid noise associated with a non-normal condition in a core gas path of the gas turbine engine may permit early detection of such non-normal conditions. In cases of real-time detection of a non-normal condition that is currently in progress, a suitable action to mitigate the non-normal condition may be initiated.

Figure 1:
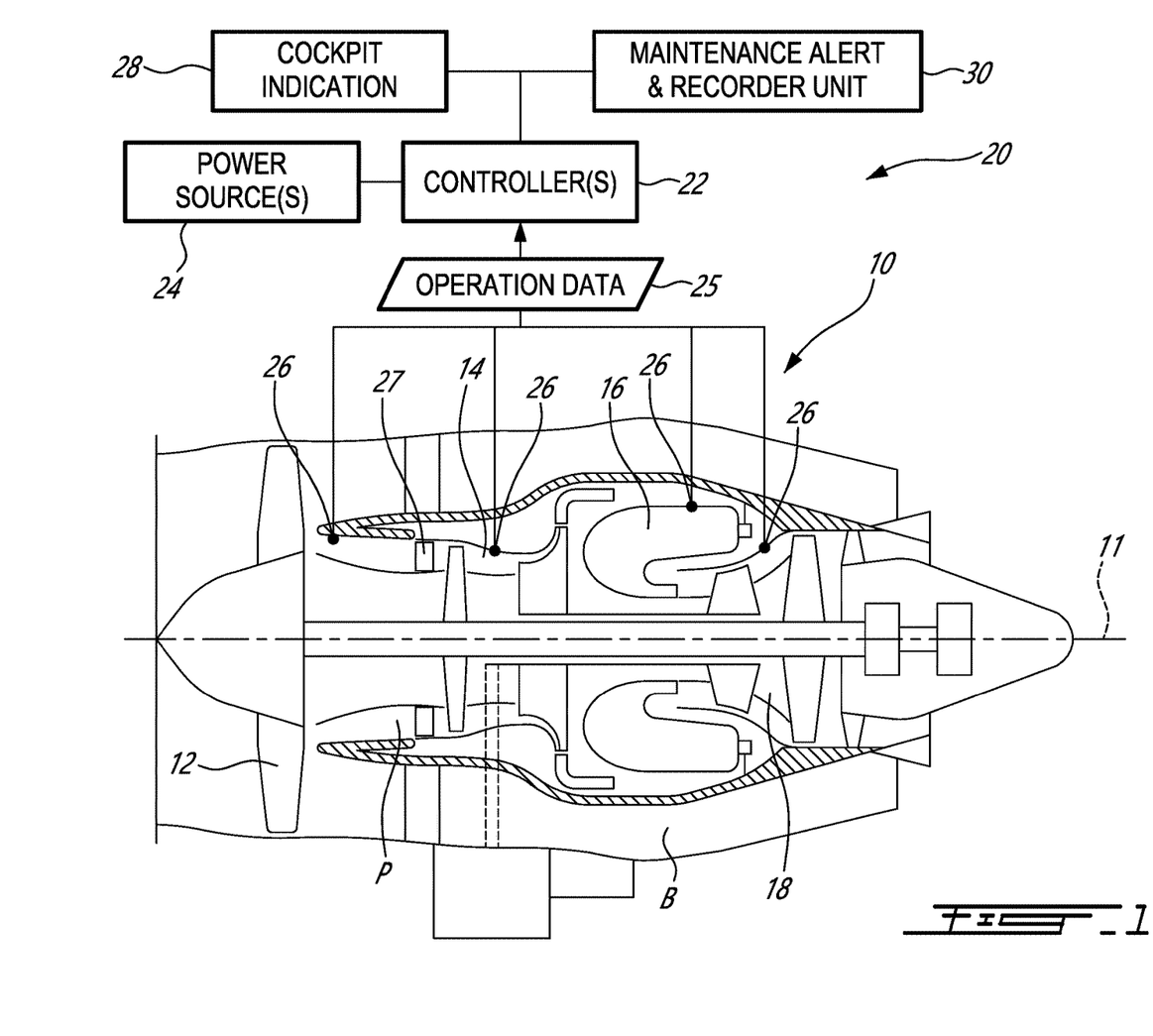
FIG. 1 is a schematic cross sectional view of an exemplary gas turbine engine and an exemplary health monitoring system as described herein.

FIG. 1 is a schematic axial cross-section view of a turbofan gas turbine engine 10 (referred hereinafter as "engine 10"), which may be mounted to an aircraft, and which may generally comprise, in serial flow communication, fan 12 through which ambient air is propelled, multi-stage compressor 14 for pressurizing the air, combustor 16 in which the compressed air is mixed with fuel and ignited for generating an annular stream of hot combustion gases, and turbine section 18 for extracting energy from the combustion gases. Engine 10 may be mounted to an aircraft and used to propel such aircraft. A core gas path P is defined through various core components of the engine 10, i.e., the compressor 14, combustor 16 and turbine section 18 between the inlet and exhaust of the engine 10. The core gas path P and the bypass duct B may be separated by a casing of the engine 10. Although FIG. 1 shows engine 10 being of the turbofan type, i.e., having a core gas path P surrounded by a bypass duct B, it is understood that aspects of the present disclosure are also applicable to other (e.g., turboshaft, turboprop) types of gas turbine engines, for instance gas turbine engines having a core gas path P but no bypass duct B.

Health monitoring system 20 (referred to hereinafter as "system 20") may be associated with (e.g., operatively connected to) and/or may be part of engine 10. System 20 may include one or more controllers 22 associated with and operatively connected to the engine 10. In some embodiments, one or more controllers 22 may be integrated with the engine 10. In some embodiments, one or more controllers 22 may be positioned remotely from the engine 10, for instance at a ground location. Instead or in addition, system 20 may include one or more computers located remotely of the engine 10. Controller 22 or the other computer may be used to perform steps of the methods described herein substantially in real-time while the engine 10 is operating and a non-normal condition is in progress, or at a later time (offline). System 20 may also include one or more electric power sources 24 operatively connected to the controller 22 to power the controller 22.

System 20 may include one or more microphones 26 acoustically coupled with the core gas path P. Illustratively, four microphones 26 are shown to be disposed inside the core gas path P, although other numbers and locations are possible. For example, one or more microphones 26 may be installed inside the core gas path P, and/or one or more microphones 26 may be installed outside of the core gas path P. In various embodiments, one or more microphones 26 may be installed at one or more locations such as: on a casing of the fan 12, at an inlet of the core gas path P, on a casing of the compressor 14, on a component of combustor 16, on a casing of the turbine section 18, on a casing of the exhaust of the core gas path P, on or inside a gearbox (e.g., accessory gearbox, reduction gearbox), and/or on or inside an accessory (e.g., oil pump) operatively connected to engine 10 for example. Microphones 26 may be passive microphones, or may receive power from electric power source 24 (for instance, via controller 22). In some embodiments, power source 24 is a battery.

During operation of the engine 10, microphones 26 are operable to acquire operation data 25 indicative of acoustic energy generated inside the core gas path P of the engine 10. Such operation data 25 may include noise generated by fluid (e.g., air, combustion gasses) flowing through the core gas path P. The controller 22 may receive the operation data 25 from the microphones 26 and compare the acquired operation data 25 to reference data 38 (shown in FIG. 2) indicative of an acoustic signature of fluid (e.g., aerodynamic) noise associated with a non-normal condition in the core gas path P. Such fluid noise may be generated by the interaction between components within the core gas path P and the fluid (e.g., air, combustion gas) flow within the core gas path P. Based on this comparison, the controller 22 may determine whether one or more non-normal conditions exist within the core gas path P. If such a determination is made, the controller 22 may generate a signal indicative of the existence of the non-normal condition(s). Various types of non-normal conditions may be detected, as will be discussed in further detail below. In some embodiments, the controller 22 may output a signal to, for instance, a cockpit indication 28 and/or a maintenance alert and recorder unit 30. The cockpit indication 28 may provide (e.g., visual, aural) indication to the aircraft pilot of the non-normal condition, while the maintenance alert and recorder unit 30 may store reported non-normal conditions.

If it is determined that a non-normal condition exists, one or more remedial actions may be initiated (e.g., by controller 22) and carried out. The remedial action may be selected to mitigate the non-normal condition. In some embodiments, the remedial action may include commanding a change in an operating parameter (e.g., fuel flow to the combustor 16, ignitor sparking frequency, position of a variable geometry mechanism 27) of the engine 10 to mitigate the non-normal condition. Such variable geometry mechanism 27 may include one or more variable-position guide vanes disposed in the core gas path P upstream of the compressor 14 or between two stages of the compressor 14. Another variable geometry mechanism may include a bleed-off valve that is selectively actuatable for causing compressed air to be bled out of the compressor 14. The variable geometry mechanism 27 may be actuated to change the aerodynamic conditions within the compressor 14 in response to detecting an aerodynamic instability inside the compressor 14 for example.

In some embodiments, if the non-normal condition is a damaged rotor blade in the core gas path P of the engine 10, the cockpit indication 28 may alert the crew to land the aircraft as soon as possible and/or to shut down the engine 10 for example. In some embodiments, the controller 22 may be configured to initiate the shut down of the engine 10 in some situations.

As another example, if the non-normal condition is an impending engine flame out due to aerodynamic compressor stall, the system 20 may be operable, for instance via commands sent by the controller 22, to automatically adjust the operating conditions inside the core gas path P via variable geometry mechanism 27, commanding ignitors, or adjusting fuel flow to the combustor 16. Such actions may alternatively be carried out by the aircraft crew if warned by the cockpit indication 28. In either case, a maintenance alert may be generated, enabling ground crew to take subsequent remedial action such as washing the compressor 14 or inspection via borescope. As another example, the non-normal condition may be a damaged (e.g., bent, fractured) airfoil of a rotor, for instance in the compressor 14. Once detected, the maintenance crew may be alerted to, for instance, perform a borescope inspection.

Figure 2:
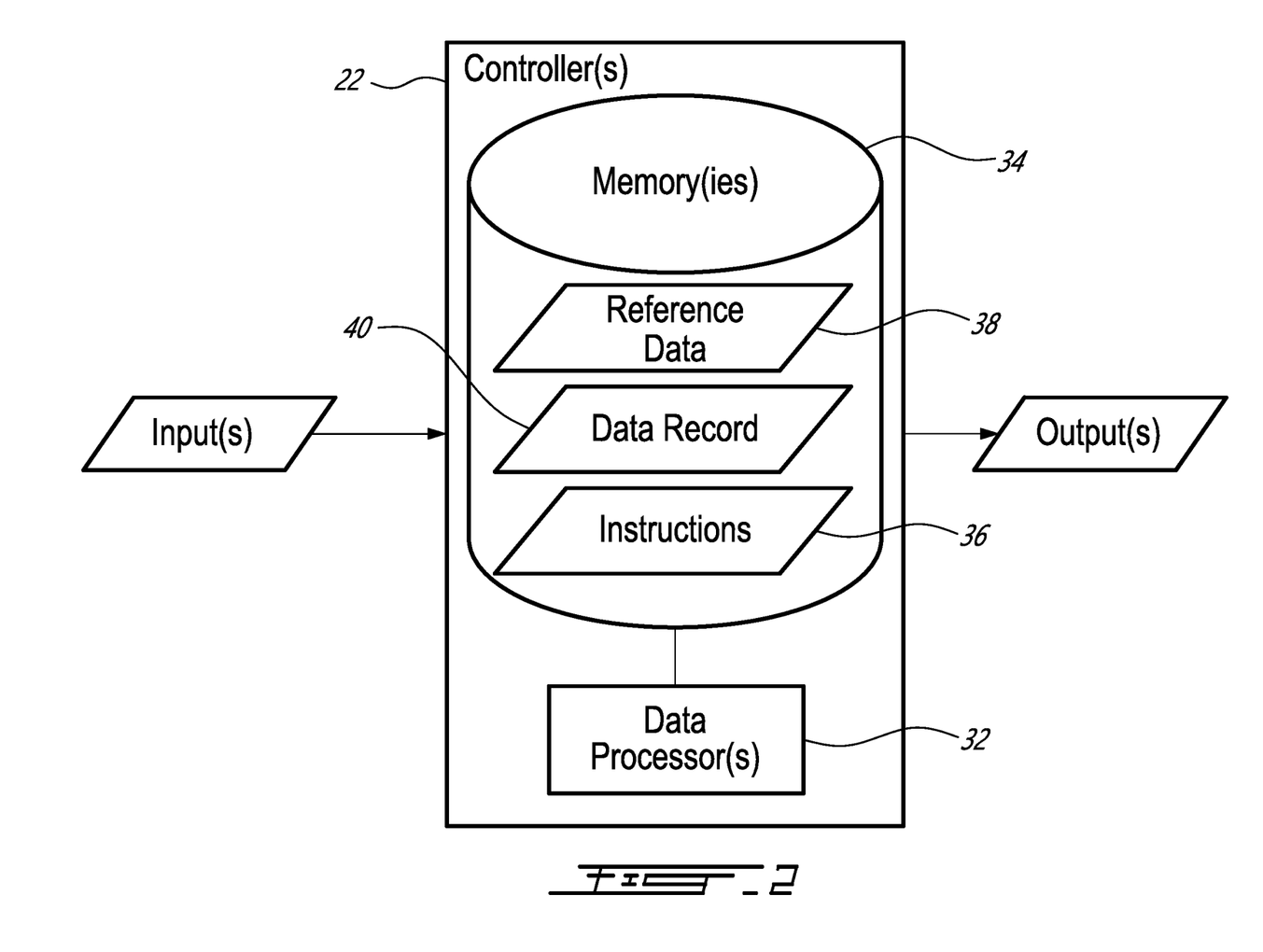
FIG. 2 is a schematic representation of an exemplary controller of the monitoring system of FIG. 1.

FIG. 2 is a schematic representation of an exemplary controller 22 of system 20. In various embodiments, controller 22 may include or form part of a Full Authority Digital Engine Control (FADEC) which may, for example, include one or more digital computer(s) or other data processors, sometimes referred to as electronic engine controller(s) (EEC) and related accessories that control at least some aspects of performance of engine 10. Controller 22 may for example be configured to make decisions regarding the control of engine 10.

Controller 22 may include one or more data processors 32 (referred hereinafter as "processor 32") and non-transitory machine-readable memory 34. Controller 22 may be configured to regulate the operation of system 20 and optionally also control other aspects of operation of engine 10. Controller 22 may carry out additional functions than those described herein. Controller 22 may receive input(s), for instance the above-mentioned operation data 25 from the microphone(s) 26, and perform one or more procedures or steps defined by instructions 36 stored in memory 34 and executable by processor 32 to generate output(s), for instance the above-mentioned signal indicative of a non-normal condition in the core gas path P. Processor 32 may include any suitable device(s) configured to cause a series of steps to be performed by controller 22 so as to implement a computer-implemented process such that instructions 36, when executed by controller 22 or other programmable apparatus, may cause the functions/acts specified in the methods described herein to be executed. Processor 32 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 34 may include any suitable machine-readable storage medium. Memory 34 may include non-transitory computer readable storage medium such as, for example, but not limited to, an electronic, magnetic, optical, electromagnetic, infrared, or semiconductor system, apparatus, or device, or any suitable combination of the foregoing. Memory 34 may include a suitable combination of any type of machine-readable memory that is located either internally or externally to controller 22. Memory 34 may include any storage means (e.g. devices) suitable for retrievably storing machine-readable instructions 36 executable by processor 32.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium(ia) (e.g., memory 34) having computer readable program code (e.g., instructions 36) embodied thereon. Computer program code for carrying out operations for aspects of the present disclosure in accordance with instructions 36 may be written in any combination of one or more programming languages. Such program code may be executed entirely or in part by controller 22 or other data processing device(s). It is understood that, based on the present disclosure, one skilled in the relevant arts could readily write computer program code for implementing the methods described and illustrated herein.

Figure 4:
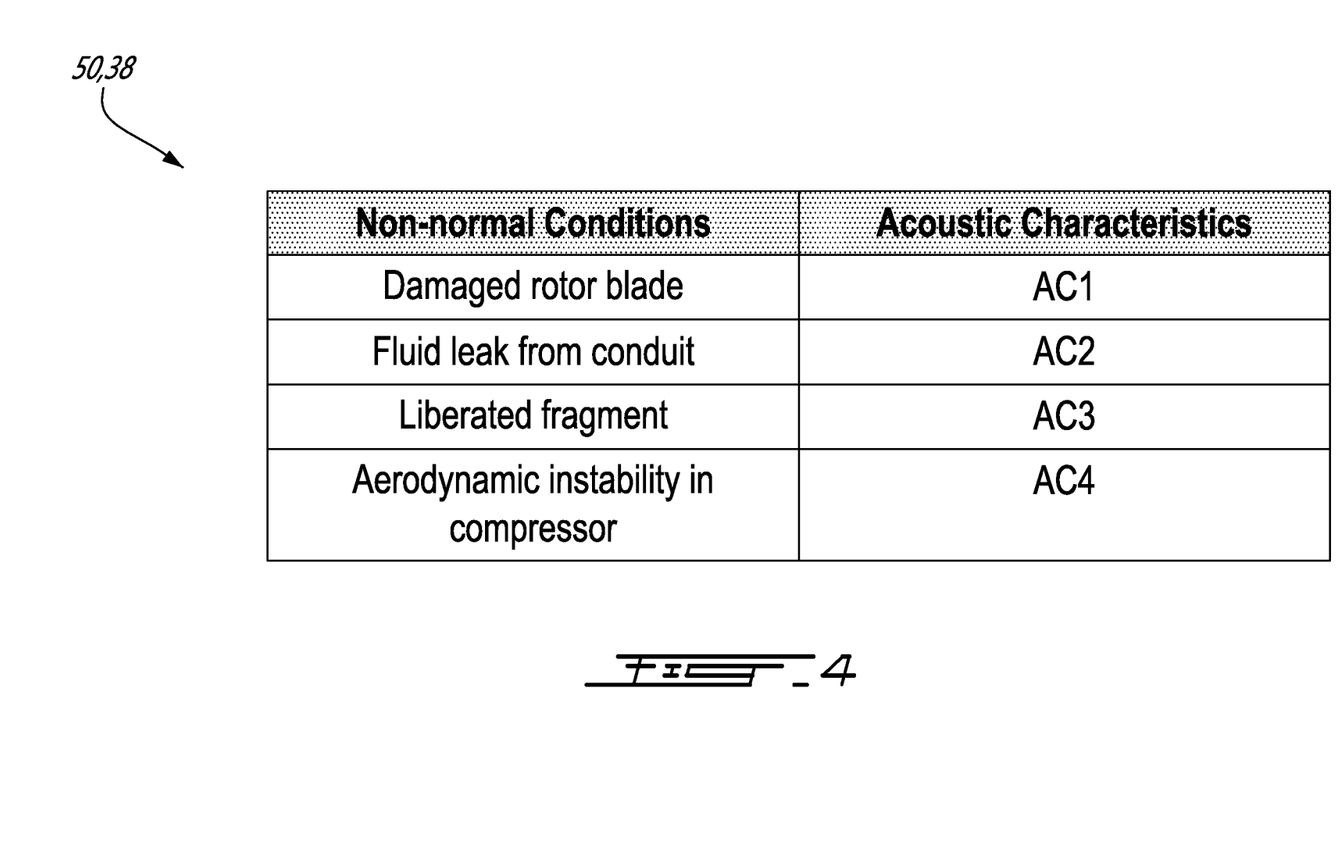
FIG. 4 is an exemplary look-up table that specifies a relation between a non-normal condition and an acoustic characteristic indicative of the non-normal condition.

In some embodiment, memory 34 may also store reference data 38 which may include data indicative of an acoustic signature of aerodynamic (i.e., fluid) noise associated with a non-normal condition in the core gas path P of engine 10. In some embodiments, reference data 38 may have the form of a look-up table as shown in FIG. 4 or may include two-dimensional patterns, and may be used to determine that a non-normal condition in the core gas path P exists based on a comparison of the operation data 25 acquired by microphone(s) 26 and the reference data 38. In some embodiments, the reference data 38 may include a dataset storing a plurality of acoustic signatures associated with respective non-normal conditions of the engine 10.

In some embodiments, memory 34 may also store data record 40 that may be constructed (e.g., populated) with previously-detected non-normal conditions in core gas path P. Data record 40 may be used by the controller 22 to assess a health condition of engine 10, and determine whether and/or what remedial action needs to be initiated and carried out.

Various means for obtaining reference data 38 indicative of an acoustic signature of fluid noise associated with a non-normal condition in the core gas path P of engine 10 may be used. For instance, during a new engine certification program, aerodynamic components within the engine may become damaged, for example by design (i.e., during specific tests) or due to error, for instance in manufacturing, testing or other. By equipping the engine undergoing testing with microphones, the acoustic signatures of non-normal conditions caused by these components may be acquired and stored to later be used as reference data 38. The "test" engine used to generate the acoustic signatures may be the same as the "in-service" engine 10, or may be another engine (e.g., of the same model or family) which may be used to generate acoustic signatures of reference data 38 that are also valid for use with the engine 10. In some embodiments, a dataset including a plurality of acoustic signatures may be constructed and used by controller 22 to identify respective non-normal conditions by comparing operation data 25 with reference data 38.

Additionally or alternatively, such acoustic signatures may be derived (e.g., calculated) via knowledge of the engine's geometry and various parameters for each aerodynamic component using simulation and modeling for example. Such parameters may include the number and relative geometry of the rotating and stationary airfoils, the rotational speed of the various rotors, the temperature of the gas flow, the operation of aerodynamic devices such as bleed valves, and the presence of engine features such as supersonic and supercritical airfoil sections.

Figure 3:
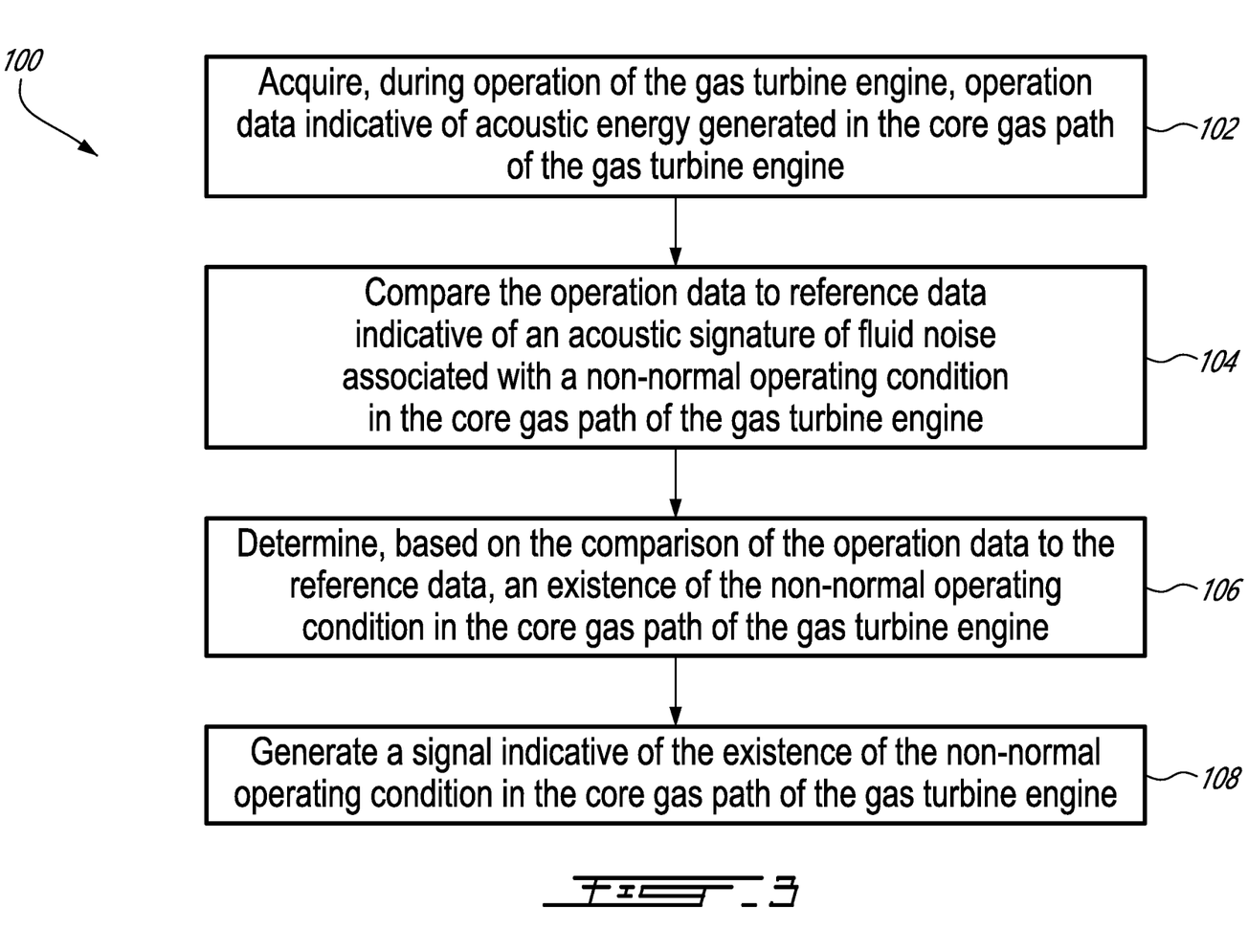
FIG. 3 is a flowchart of an exemplary health monitoring method for the engine of FIG. 1.

FIG. 3 is a flowchart illustrating an exemplary method 100 of monitoring the health of the engine 10 or another gas turbine engine. Method 100 may be performed using system 20 described herein or using another system. Aspects of method 100 may be combined with other methods or steps described herein. Method 100 may also include aspects of system 20. Some or all aspects of method 100 may be performed on-board the aircraft in real-time (e.g., while the non-normal condition is in progress). Alternatively, aspects of method 100 may be performed in non-real-time after the non-normal condition has occurred to determine a past existence of the non-normal condition. In various embodiments, method 100 may include:

acquiring, during operation of the engine 10, operation data 25 indicative of acoustic energy generated by the core gas path P of the engine 10 (block 102);

comparing the operation data 25 to reference data 38 indicative of an acoustic signature of fluid noise associated with a non-normal condition in the core gas path P of the gas turbine engine 10 (block 104);

determining, based on the comparison of the operation data 25 to the reference data, that the non-normal condition exists within the core gas path P of the gas turbine engine 10 (block 106); and generating (i.e., outputting) a signal indicative of the existence of the non-normal condition within the core gas path P of the gas turbine engine 10 (block 108).

In some embodiments, the reference data 38 may be acquired from a core gas path P of another gas turbine engine in which the non-normal condition is known to exist.

In some embodiments, the operation data 25 is acquired via one or more microphones 26 acoustically coupled with the core gas path P. In some embodiments, the microphone(s) 26 are disposed inside the core gas path P and/or at other locations within the engine 10.

In some embodiments, the non-normal condition includes a damaged (e.g., bent, fractured) rotating blade in the core gas path, such as from a rotor of compressor 14 or of turbine section 18. In some embodiments, the non-normal condition includes an air or other fluid leak in a conduit (e.g., pipe) that may extend into the core gas path P. In some embodiments, the non-normal condition includes a foreign object or a liberated fragment of an engine component (e.g., stator or rotor) within a cavity in the core gas path P. In some embodiments, the non-normal condition includes aerodynamic instability in the compressor 14, which may be indicative of an impending surge condition. In some embodiments, method 100 may be implemented to simultaneously monitor for various non-normal conditions within the core gas path P.

In some embodiments, the comparison between the operation data 25 to the reference data 38 includes transforming the operation data 25 to a representation in a frequency domain using a fast Fourier transform (FFT) approach for example. Such transformation may occur in substantially real time so that the determination of the existence of the non-normal condition may also be carried out in real time. In some embodiments, the frequencies and/or amplitudes of the operation data 25 may be compared with the frequencies and/or amplitudes of the reference data 38. In some embodiments, the reference data 38 may be provided in the frequency domain.

In some embodiments, method 100 may further include initiating an action to mitigate the non-normal condition. In some embodiments, initiating the action to mitigate the non-normal condition includes shutting down the engine 10, adjusting fuel flow, adjusting a sparking frequency of an ignitor and/or adjusting variable geometry mechanism 27 for example. Mitigating the non-normal condition relatively early may prevent the escalation of the non-normal condition. As example, detecting early signs of aerodynamic instability within compressor 14 may permit a compressor surge condition to be prevented by the adjustment of variable geometry mechanism 27.

System 20 may be operable to carry out method 100 in real-time, i.e., onboard the aircraft. In other words, controller 22 may be configured to, in real-time, receive operation data 25 from the one or more microphones 26, compare it to the reference data 38 to determine if one or more non-normal conditions exist, and, if yes, output an alert to this effect. In other embodiments, system 20 may be configured to transmit the operation data 25 to a remote location, for instance a ground monitoring station, where method 100 may be carried out. In such cases, method 100 may be carried out in real-time at the remote location, or in non-real-time such as subsequently to operation of the engine 10 for example.

In some embodiments, method 100 may include constructing a dataset including a plurality of acoustic signatures associated with respective non-normal conditions. Method 100 may then use such dataset as reference data 38.

FIG. 4 is an exemplary look-up table 50 comprising reference data 38 that may be used to identify non-normal conditions in the core gas path P that may be used by system 20 and by method 100. For each exemplary non-normal conditions, an acoustic characteristic AC1-AC4 (e.g., amplitude, frequency and/or two-dimensional pattern) corresponding to a given non-normal condition is shown. In some embodiments, this reference data 38 may be acquired prior to monitoring of engine 10, for instance by using one or more microphones 26 in a core gas path P of another engine in which the non-normal condition(s) is/are known to exist, to acquire acoustic signatures associated with each non-normal condition. Each acoustic signature may be analyzed for its frequency and/or amplitude, which data may populate the look-up table 50 shown in FIG. 4. The operation data 25 acquired by microphone(s) 26 may then be compared to the reference data 38, for instance by processor 32, to determine if the frequency and/or amplitude of the operation data 25 matches that of the reference data 38. In some cases, the reference data 38 may be a maximum operating value, for instance a maximum frequency/amplitude, above which a given non-normal condition exists. In other cases, the reference data 38 may be a minimum operating value, below which a given non-normal condition exists. Various predetermined tolerances or thresholds between the operation data 25 and reference data 38 may be used, for instance to prevent false-warnings of non-normal conditions.

In another embodiment, rather than comparing a single (i.e., one-dimensional) parameter (e.g., frequency, amplitude) of the operation data 25 to a like parameter of the reference data 38, two-dimensional (e.g., time or frequency based) patterns in the operation data 25 may be compared with two-dimensional (e.g., time or frequency based) patterns in the reference data 38. In some embodiments, determining the existence of the non-normal condition may include using operation data 25 and reference data 38 that are in the time domain when a time-domain characteristic is sought. In some situations, the use of operation data 25 and reference data 38 in the time domain may promote computational efficiency. In some embodiments, determining the existence of the non-normal condition may, alternatively or in addition, include using operation data 25 and reference data 38 that are in the frequency domain when a frequency-domain characteristic is sought.

Figure 5:
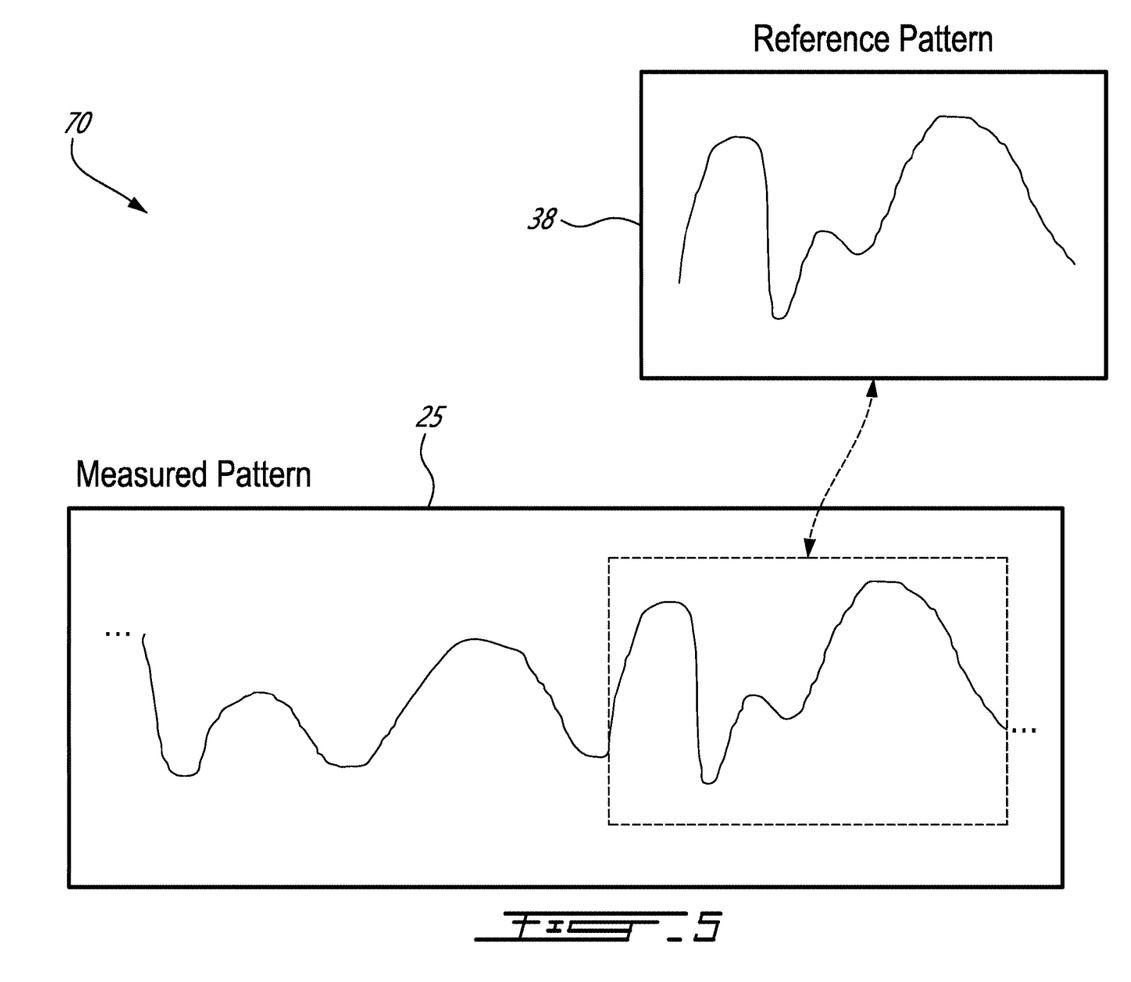
FIG. 5 is a graphical representation of a comparison between operation data of the gas turbine engine of FIG. 1 and a reference acoustic signature indicative of a non-normal condition in a core gas path of the gas turbine engine of FIG. 1.

FIG. 5 shows an exemplary graphical representation 70 of such a comparison. For instance, each graph may represent amplitude or frequency versus time, and a two-dimensional pattern of the acquired operation data 25 may be compared to a two-dimensional pattern of the reference data 38 indicative of an acoustic signature of aerodynamic or other fluid noise associated with a non-normal condition in the core gas path P of the engine 10. The controller 22 may thus compare the patterns to determine if the non-normal condition exists. Each graph may thus contain a pattern representing numerical two-dimensional data of the operation data 25 or the reference data 38. Comparing the patterns may include, for instance, comparing the peaks (i.e., maximum or minimum values) with respect to time of each pattern and determining if the patterns match within a predefined (e.g., best-fitting) threshold (e.g., tolerance).

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method of operating a gas turbine engine, the method comprising:
   receiving reference data indicative of an acoustic signature of fluid noise associated with a non-normal condition in a core gas path of the gas turbine engine;
   during operation of the gas turbine engine, acquiring operation data indicative of acoustic energy generated in the core gas path of the gas turbine engine;
   comparing, at a controller of the gas turbine engine, the operation data to the reference data;
   determining, based on the comparing of the operation data to the reference data, an existence of the non-normal condition in the core gas path of the gas turbine engine; and
   in response to determining the existence of the non-normal condition, generating, at the controller of the gas turbine engine, a signal indicative of the existence of the non-normal condition in the core gas path of the gas turbine engine; and
   initiating, at the controller, an action to mitigate the non-normal condition.

2. The method as defined in claim 1, comprising, prior to receiving the reference data, acquiring the reference data from another gas turbine engine in which the non-normal condition exists.

3. The method as defined in claim 1, wherein acquiring the operation data includes acquiring the operation data via a microphone acoustically coupled with the core gas path of the gas turbine engine.

4. The method as defined in claim 3, wherein the microphone is disposed inside the core gas path of the gas turbine engine.

5. The method as defined in claim 1, wherein determining the existence of the non-normal condition within the core gas path of the gas turbine engine includes determining that the operation data matches the reference data within a predetermined threshold.

6. The method as defined in claim 1, wherein the non-normal condition includes a damaged rotor blade disposed in the core gas path of the gas turbine engine.

7. The method as defined in claim 1, wherein the non-normal condition includes a fluid leak from a conduit.

8. The method as defined in claim 1, wherein the non-normal condition includes a presence of a liberated fragment of an engine component within the core gas path of the gas turbine engine.

9. The method as defined in claim 1, wherein the non-normal condition includes an aerodynamic instability in a compressor of the gas turbine engine.

10. The method as defined in claim 1, wherein comparing the operation data to the reference data includes transforming the operation data to a representation in a frequency domain.

11. The method as defined in claim 1, wherein comparing the operation data to the reference data includes comparing an amplitude and/or a frequency of the operation data to an amplitude and/or a frequency of the reference data.

12. The method as defined in claim 1, wherein comparing the operation data to the reference data includes comparing a two-dimensional pattern of the operation data to a two-dimensional pattern of the of the reference data.

13. The method as defined in claim 1, wherein initiating the action to mitigate the non-normal condition includes initiating a shutdown of the gas turbine engine.

14. The method as defined in claim 1, wherein:
   the non-normal condition includes an aerodynamic instability in a compressor of the gas turbine engine; and
   initiating the action to mitigate the non-normal condition includes commanding an actuation of a variable geometry mechanism associated with the compressor of the gas turbine engine.

15. A health monitoring system for a gas turbine engine, the health monitoring system comprising:
   a microphone operable to acquire operation data indicative of acoustic energy generated in a core gas path of the gas turbine engine during operation of the gas turbine engine;
   one or more data processors operatively coupled to the microphone; and
   non-transitory machine-readable memory storing:
      reference data indicative of an acoustic signature of fluid noise associated with a non-normal condition in the core gas path of the gas turbine engine;
      instructions executable by the one or more data processors and configured to cause the one or more data processors to:
         compare the operation data acquired by the microphone to the reference data;
         determine, based on the comparing of the operation data to the reference data, an existence of the non-normal condition in the core gas path of the gas turbine engine; and generate a signal indicative of the existence of the non-normal condition in the core gas path of the gas turbine engine, and
   a controller of the gas turbine engine, wherein:
   the controller includes the one or more data processors; and
   the controller is configured to:
      determine the existence of the non-normal condition when the non-normal condition is in progress; and
      command a change in an operating parameter of the gas turbine engine to mitigate the non-normal condition.

16. The health monitoring system as defined in claim 15, wherein the microphone is disposed inside the core gas path of the gas turbine engine.

17. A method of operating a gas turbine engine, the method comprising:

receiving reference data indicative of an acoustic signature of fluid noise associated with a non-normal condition in a core gas path of the gas turbine engine;

during operation of the gas turbine engine, acquiring operation data indicative of acoustic energy generated in the core gas path of the gas turbine engine;

comparing, at a controller of the gas turbine engine, the operation data to the reference data;

determining, based on the comparing of the operation data to the reference data, an existence of the non-normal condition in the core gas path of the gas turbine engine; and in response to determining the existence of the non-normal condition, generating, at the controller of the gas turbine engine, a signal indicative of the existence of the non-normal condition in the core gas path of the gas turbine engine, wherein the method includes, prior to receiving the reference data, acquiring the reference data from another gas turbine engine in which the non-normal condition exists.

* * * * *